United States Patent

Hobbs et al.

[11] 4,035,620
[45] July 12, 1977

[54] BUMPLESS CONTROL TRANSFER

[75] Inventors: James W. Hobbs; Dexter E. Smith, both of Bartlesville, Okla.

[73] Assignee: Phillips Petroleum Company, Bartlesville, Okla.

[21] Appl. No.: 607,419

[22] Filed: Aug. 25, 1975

[51] Int. Cl.² .................................................. G05B 7/00
[52] U.S. Cl. ........................... 235/151.1; 318/591; 318/115
[58] Field of Search ........... 235/151.1, 151, 150.1, 235/153 AE; 318/591; 340/146.1 C

[56] References Cited

U.S. PATENT DOCUMENTS

| | | | |
|---|---|---|---|
| 3,034,718 | 5/1962 | Freitas et al. ........................ | 235/151 |
| 3,452,258 | 6/1969 | Thompson et al. ................... | 318/18 |
| 3,483,552 | 12/1969 | Millar .................................. | 340/347 |
| 3,552,872 | 1/1971 | Giras et al. ...................... | 235/151 UX |
| 3,576,535 | 4/1971 | Turner ............................... | 318/591 X |
| 3,623,077 | 11/1971 | Clark ........................... | 235/151.1 X |
| 3,655,992 | 4/1972 | Ohno et al. ......................... | 318/591 X |
| 3,665,172 | 5/1972 | Spaargaren et al. ............ | 318/591 X |
| 3,820,323 | 6/1974 | Burnell et al. ................. | 60/39.28 R |
| 3,940,594 | 2/1976 | Bleak et al. ....................... | 318/591 X |

Primary Examiner—Joseph F. Ruggiero

[57] ABSTRACT

Bumpless transfer of control of a process parameter from control in response to a conventional controller set point to automatic control in response to a supervisory set point is accomplished by substituting an alignment set point for the conventional set point and subsequently substituting the supervisory set point of the alignment set point.

12 Claims, 5 Drawing Figures

BUMPLESS CONTROL TRANSFER

This invention relates to transfer of control of a process parameter from a local control system to an automatic control system. In another aspect the invention relates to transfer of control of a process parameter utilizing an interim alignment controller. In yet another aspect the invention relates to a method and apparatus for controlling a process. In another aspect the invention relates to bumpless transfer among alternative control systems associated with a process.

The development of automatic control systems for use with various processes has brought with it the need for methods and apparatus for efficiently transferring control between a conventional or manual control system and an automatic control system or among the various alternative control systems associated with a process. In the past such transfer systems have often required action on the part of an operator to initialize the automatic control system or to bring the process operation to a required condition, or both, prior to transfer of control to the automatic system. Such procedures, particularly in the case of comprehensive, sophisticated control systems, are often unduly demanding of the process operator, both in terms of the time required to effect a change in process control and in terms of the detailed knowledge of the control system required to insure a control system change which will result in minimal disruption of the process.

It is therefore an object of the invention to provide a method and apparatus for controlling a process. Another object of the invention is to provide transfer of control of a process from a local control system to an automatic control system. Still another object of the invention is to provide transfer of control of a process parameter utilizing an interim alignment controller. Yet another object of the invention is to provide bumpless transfer among alternative control systems associated with a process.

In accordance with the invention, a process operator may change from control of a process parameter in response to a conventional operator-entered set point signal to automatic control of the process parameter by simply switching to control in response to an alignment controller for a period of time sufficient to provide proper initialization of process and control system conditions, then switch from alignment control to automatic control. This procedure can be further simplified by those skilled in the art to permit the operator to simply switch from local control to automatic control with alignment control being automatically interposed until transfer to automatic control without process interruption can be automatically accomplished.

A preferred automatic control system for use in accordance with the invention is a control system which continuously monitors the value of a process parameter signal obtained in response to measurement of the process parameter to be controlled and maintains substantially the same output condition it would if it were actually controlling the process parameter being measured. Even with an automatic control system which performs this function, however, the absence of actual control can result in minor calibration errors or drift of signal values or other similar conditions which always exist in any practical control system, keeping the output of the automatic controller from being the output which would be present under actual control conditions. Even though the output may be continuously updated, errors may still be present since actual control of the process in the conventional mode is ordinarily accomplished in terms of signals which must be appropriately translated and/or conditioned prior to acceptance by the automatic control means.

In accordance with the invention, the interim alignment control utilized provides for control of the measured process parameter in response to signals of the same format as those which are to be utilized by the automatic control system, thereby eliminating errors due to calibration, translation, signal conditioning, drift, or other similar errors which may be present as a result of the particular signals from which the automatic control system will operate not being included in a closed control group during conventional manual control of a process.

Other objects and advantages of the invention will be apparent from the specification and claims and from the detailed description of the drawings in which:

Figure 1:
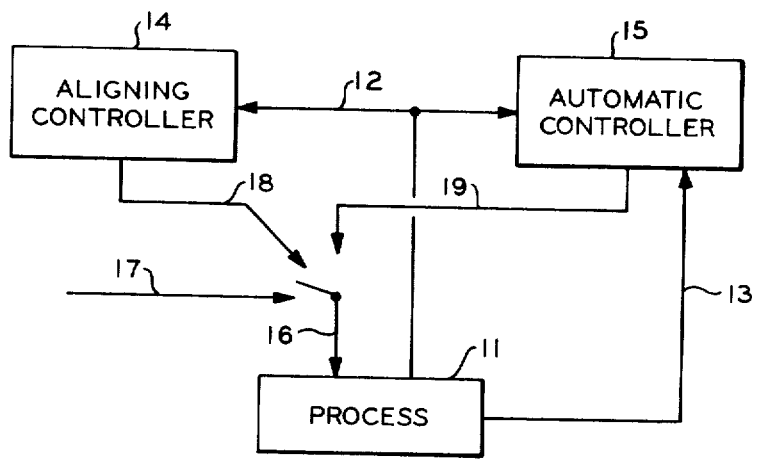
FIG. 1 is a schematic block diagram of control of a process in accordance with the invention.

Referring now to FIG. 1 in detail, there is schematically illustrated a process 11. Within the process 11 is a process parameter, which can be any process condition susceptible to being measured, either directly or indirectly, and controlled. A process parameter signal 12 generated in response to either direct or indirect measurement of the process parameter to be controlled is delivered to an aligning controller means 14 and an automatic controller means 15. In order to control the selected process parameter, a control signal 16 is delivered to the process for use by conventional control means associated with the process. While the control signal, such as signal 16 illustrated in conjunction with the preferred embodiments of the invention, is preferably a set point signal for use by a parameter control means associated with the process, the application of other signals 16 which can be effectively used to control the specified process parameter is within the scope of the invention. The process control signal 16 is selected from a conventional fixed signal 17 such as an operator-entered set point signal, an aligning signal 18 generated in response to the process parameter signal 12, and a control signal 19 generated by the automatic controller 15. Other process parameter signals 13 can be generated in response to either direct or indirect measurement of additional process parameters and delivered to the automatic controller means 15 for use in generating an automatic set point signal. Automatic control signal 19 can be generated in response to the process parameter signal 12 or can be generated in response to other process signals 13 which can be used as a basis for determination of the desired value for the selected process parameter. Even though the process parameter signal 12 may not be used by the automatic controller 15 in the generation of the automatic control signal 19, it may nonetheless be utilized by the automatic controller 15 to maintain an automatic control signal 19 which is at all times as close as possible to the signal 19 which would be generated if the process was actually being controlled in response to the automatic control signal 19.

Figure 2:
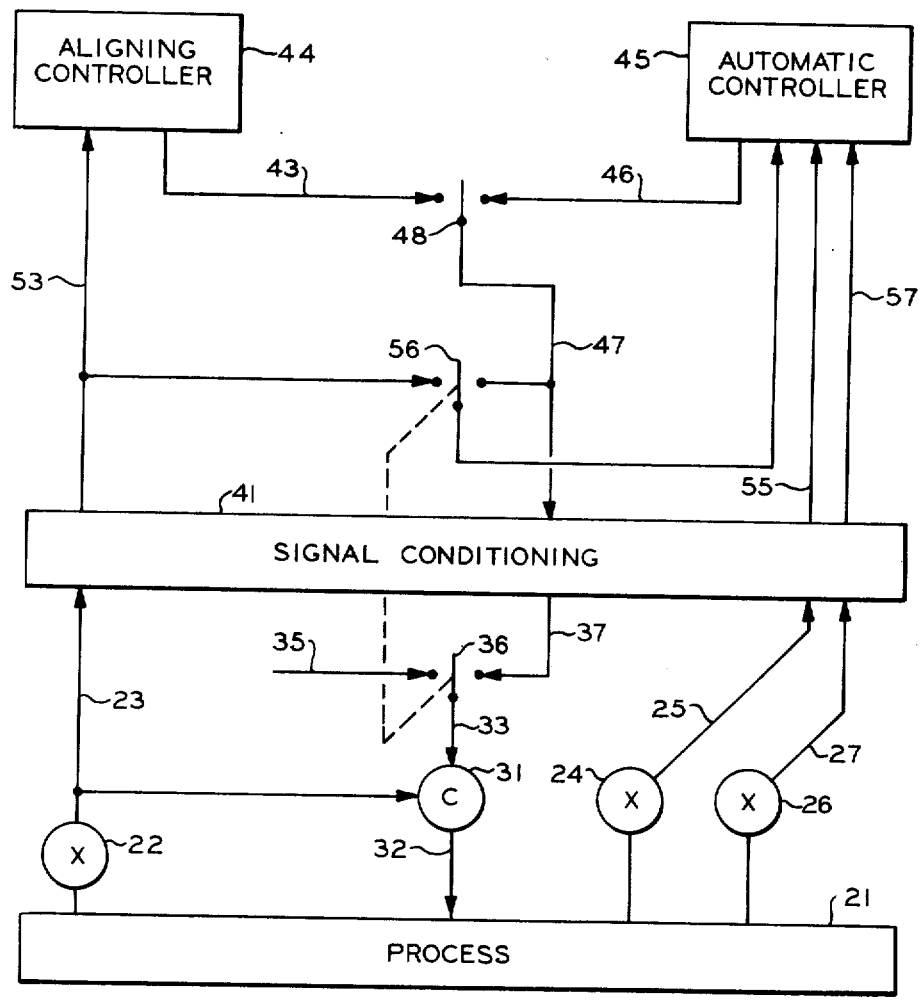
FIG. 2 is a schematic block diagram of a control system illustrating a preferred use of the invention to control a process.

FIG. 2 illustrates a process 21 having associated therewith a plurality of process parameter transducers 22, 24, 26 for producing process measurement signals 23, 25, 27, respectively which are representative of the values of the respective process parameters measured. A parameter controller means 31 produces a parameter control signal 32 in response to a comparison between the parameter measurement signal 23 and a set point signal 33 representing the desired value of the controlled parameter. The parameter controller 31 and its relationship to the parameter transducer 22 and parameter measurement signal 23 are easily recognizable as a conventional manual feedback control system when a conventional set point signal 35 is selected by a switch means 36 for use as the set point signal 33. Such a set point signal 35 is commonly adjustable by the process operator but is otherwise fixed at the value determined and provided by the process operator. The switch means 36 is utilized to select between this local set point signal 35 and a remote set point signal 37 for use as the set point 33 to the controller 31. The terms local and remote as used herein are not intended to imply any specific geographic relationship among the various control elements or systems disclosed but are used to distinguish between a set point signal such as the set point signal 35 which is established and applied to the switch means 36 directly and a signal such as a remote set point signal 37 which is often the result of properly translating and/or conditioning a signal which is not directly compatible for use as a set point to the controller 31. In another sense a local signal is one which is obtained directly from the process or is entered directly by an operator, whereas a remote signal is one which is communicated by means of a separate control system such as, for example, a digital computer, even though the information contained in the signal was originally provided to the computer or other similar means by a process measurement or by a process operator. Local control systems are considered to include those systems orginarily known in the art as "conventional" or "manual" systems as well as other systems which do not communicate directly with an automatic control system without signal translation or conditioning.

The remote set point signal 37 is generated in response to the output of an aligning controller 44 or an automatic controller 45. The aligning controller 44 and automatic controller 45 are separated from the process and from the process parameter controller 31 by one or more signal conditioning means 41 which provides necessary translation and/or conditioning in order to permit a workable interchange of information between the process 21 and process parameter controller 31 and the aligning controller 44 and automatic controller 45. For example, the parameter measurement signal 23 is accepted by the signal conditioning means 41 and a process parameter signal 53 is delivered in response thereto by the signal conditioning means 41. The process parameter signal 53 will contain the same information as the process measurement signal 23 but will have been changed to a scale and/or format which is readily acceptable by the aligning controller 44 for use in generating an aligning set point signal 43.

In a similar manner signals 25 and 27 are accepted by the signal conditioning means and delivered to the automatic controller as signals 55 and 57, respectively, from which the automatic controller 45 is capable of generating a supervisory set point signal 46. A switch means 48 selects between the aligning set point signal 43 and the supervisory set point signal 46 for use as a signal 47 which is accepted by the signal conditioning means 41 and delivered as the remote set point signal 37 to the switch means 36.

The preferred automatic controller 45 illustrated is one which is capable of generating a supervisory control set point signal 46 in response to measurement of process parameters other than the parameter which is controlled by the process parameter controller 31. It is to be understood that the use of a supervisory controller which generates a supervisory set point signal in response to the process parameter signal 53, in response to one or more other process parameter signals, or in response to a combination of the process parameter signal 53 and other signals generated in response to the measurement of other process parameters, is within the scope of the invention. The preferred automatic controller 45 illustrated by FIG. 2 also has the capability of continuously generating a supervisory set point signal 46 equal to the process parameter signal 53 when the local set point signal 35 is being used as a set point to the process parameter controller 31 and equal to the aligning set point signal 43 when the aligning set point signal 43 is being transmitted as signal 47 to be provided as a remote set point signal 37 to the process controller 31. For this purpose a switch means 56 is operably connected through the signal conditioning means 41 to the switch means 36 for delivering the process parameter signal 53 to the automatic controller 45 when the switch means 36 is in its local position and for delivering the signal 47 to the automatic controller 45 when the switch means 36 is in its remote position. When the switch means 36 is in the remote position and the switch means 48 has selected the supervisory control signal 46 as the signal 47, the automatic controller 45 is equipped with internal means for generating the supervisory set point signal 46 in accordance with a preselected supervisory control scheme rather than in response to the signal 47.

In the operation of the system illustrated by FIG. 2, one can readily see that with an ideal signal conditioning means 41, as well as an ideal process parameter controller means 31 and ideal process transducers, transfer from use of the local set point signal 35 directly to use of the remote supervisory set point signal 37 could be accomplished simply by selecting the supervisory set point signal 46 as the signal 47 and changing the switch mens 36 from its local position to its remote position. This would be possible since, using ideal control means and signal conditioning means, the process parameter signal 53 which had been used by the supervisory controller 45 to maintain an up-to-date supervisory set point signal 46 during local control would contain exactly the same information as the process measurement signal 23, and, with an ideal control means 31 and a transducer 22, the controller 31 would be maintaining the process parameter at exactly the value specified by the set point signal 35, and the process measurement signal 23 produced by the transducer 22 would be exactly equal to the local set point signal 35. Since the supervisory set point 46 would be equal to the process parameter signal 53 at the time of transfer of control and since the ideal signal conditioning means would produce a signal 37 containing exactly the same information as the supervisory set point signal 46 delivered thereto as signal 47, there would be no disruption of the process following such a transfer of control.

In actual practical control systems, however, each controller, transducer, signal conditioning element, and other similar apparatus will have associated therewith some degree of error. On an abrupt change from local control to remote automatic control, the total accumulated error in the system will be viewed by the process parameter controller 31 as an abrupt change in set point. As a result, the value of the process parameter will be altered by the controller 31, thereby causing the process measurement signal 23 to move to a new value as soon as the time characteristics of the parameter controller 31 and the process itself will permit. Although the types of automatic controllers 45 which could be utilized in conjunction with the invention vary in complexity and degree of sophistication, all will view such an upset within the process caused by the change from local to remote automatic control as a phenomenon caused by some disruption within the process itself, and will attempt to initiate controls to correct the disruption. The amount of error which can be tolerated by such a control system is therefore determined by the characteristics of the individual system, and control inefficiency, or even instability, can result if the accumulated error at the time of transfer to automatic control is large enough.

In accordance with the invention, transfer from local control to remote aligning control is accomplished using the aligning controller 44 to correct the system for accumulated error and to ready the process for transfer of control to the automatic controller 45. Since the preferred aligning controller 44 and automatic controller 45 are compatible and are capable of using the same signals without signal conditioning or scaling required for communication from one to the other, the error observed in transferring from control in response to the aligning set point signal 43 to control and response to the supervisory set point signal 46 is insignificant and, for most systems, will be essentially zero.

Depending upon the particular control system and the particular process which it controls, various types of signals will ordinarily be used at different points in the control system. For example, the signals applied to actual control apparatus of a process will quite often be pneumatic, hydraulic, or electrical analog signals with pneumatic and hydraulic signals being generally preferred for most processes in which there is some danger of fire or explosion resulting from malfunction of a piece of electrical equipment. In addition, some process control systems use direct mechanical control means. Automatic control systems, on the other hand, are quite often implemented by means of electrical analog or digital electronic means such as an analog or digital computer having either a fixed or programmable function. In addition, many forms of signal representation, such as pneumatic or hydraulic analog signals, are ordinarily converted to an electrical analog signal prior to conversion of the electrical analog signal to a digital electronic signal, thereby further increasing the opportunity for error in a pneumatically controlled process which uses an electronic digital implemented automatic control system, for example.

Figure 3:
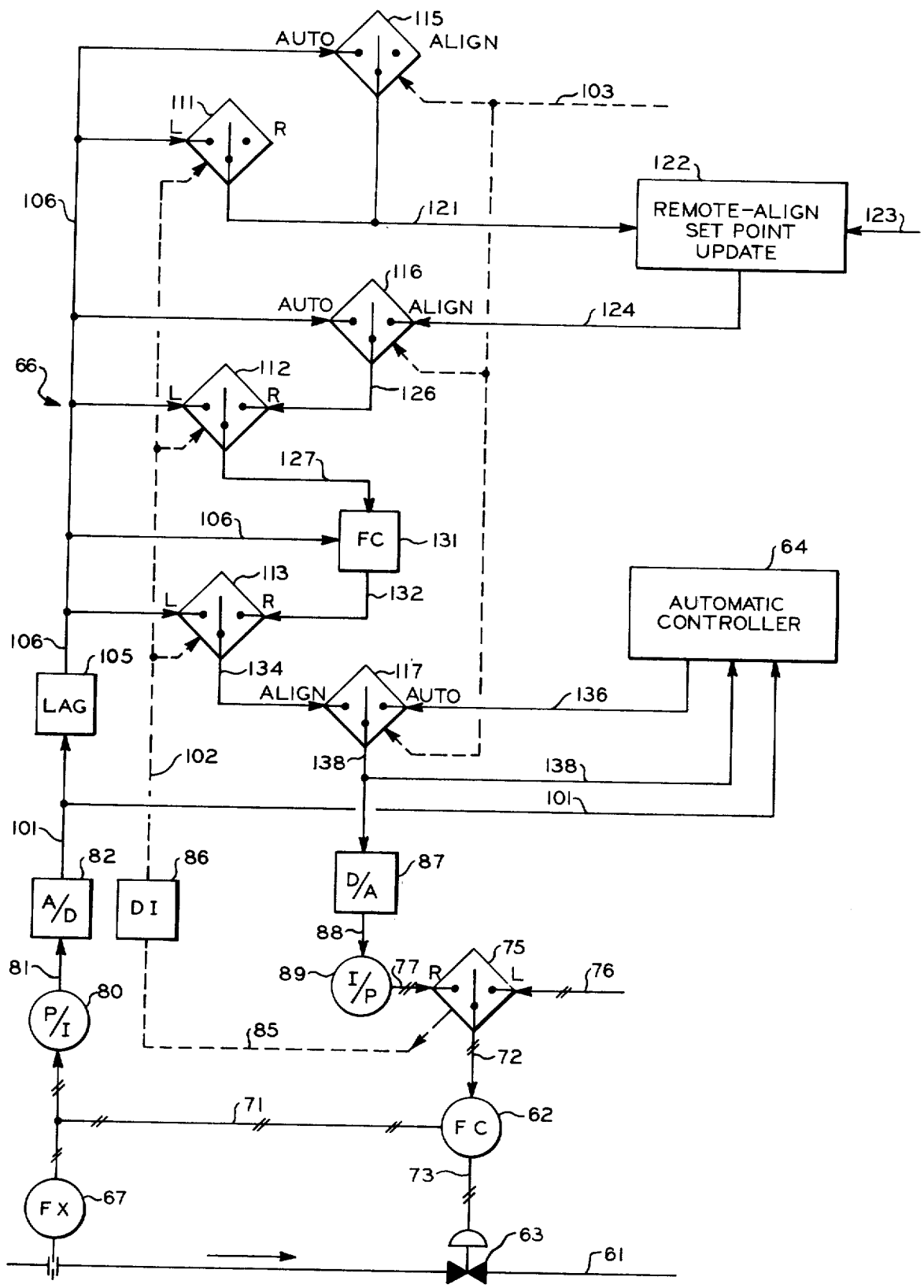
FIG. 3 is a schematic block diagram of a particularly preferred embodiment of the invention utilizing digital aligning control and automatic control means.

FIG. 3 illustrates a preferred embodiment of the invention wherein a digital electronic aligning controller means 66 and a digital electronic automatic supervisory controller means 64 are utilized in conjunction with a local pneumatic control system. The process parameter shown by FIG. 3 for the purpose of illustration is the flow of material through a conduit 61 which is controlled by a flow controller means 62 operably associated with a valve means 63. A flow transducer means 67 produces a pneumatic flow measurement signal 71 representative of the flow rate of material through the conduit 61. The flow controller means 62 compares the signal 71 to a pneumatic set point signal 72 and delivers a valve control signal 73 in response to the comparison. A pneumatic switch means 75 has a local position in which a pneumatic set point signal 76 is provided by a process operator is delivered as the set point signal 72 to the flow controller means 62. The switch means 75 also has a remote position in which a remote set point signal 77 is selected for delivery as the set point signal 72.

A pressure to current converter means 80 converts the flow measurement signal 71 to an electrical analog current signal 81 which is in turn converted by an analog to digital converter means 82 to an electronic digital flow rate signal 101 responsive to the flow measurement signal 71 and representative of the rate of flow of material through the conduit 61.

A switch condition sensing means which is a part of, or associated with, the switching means 75 produces a switch condition signal 85 which can be an electrical, mechanical, or other similar signal implementation capable of conveying information relating to the position of the switch means 75. The signal 85 is provided to a digital input means. The digital input means 86 provides a digital switch position signal 102 indicative of whether the switch means 75 is in the local or remote position. Selection between the alignment and automatic modes of remote control is provided by a mode selection signal 103 which can be either entered into the digital control apparatus by the process operator or automatically generated within the digital control apparatus in response to preselected control conditions.

A filtering means such as a first order lag means 105 converts the digital flow rate signal 101 to a lagged flow rate signal 106 for use by the aligning controller means 66.

A preferred lag means is of the type capable of implementing an algorithm of the general form:

$$FL = FL + (TS/TL) * (F-FL)$$

where
$FL$ = the lagged flow rate signal = signal 106
$TS$ = elapsed time
$TL$ = lag time constant
$F$ = flow rate signal = signal 102 Although it is within the scope of the invention to utilize the flow rate signal 101 directly in place of the lagged flow rate signal 106, it is often desirable to utilize a filtered or lagged signal for digital control purposes in order to have a signal from which short term or transient fluctuations, such as noise and other similar signal variations, have been eliminated.

The alignment control means 66 comprises a plurality of switch means 111, 112, and 113, responsive to the switch position signal 102 for altering the operation of the controller to the response to the condition of the switch means 75. In addition, a plurality of switch means 115, 116, 117, are responsive to the mode selection signal 103 for altering the control system for operation in either the remote-align or remote-automatic mode.

The switching means 111 and 115 combine to deliver the lagged flow rate signal 106 as an input signal 121 to a remote-align set point update means 122 whenever the system is not in the remote-align mode of operation. In addition, the remote-align set point update means 122 is capable of accepting an operator entered signal 123 so that the remote-align mode of control can also be used as a remote implementation of direct operator control when desired. The characteristics of the set point update means 122, however, are such that whenever the system is not in remote-align and a signal 121 is being provided thereto, the output signal 124 thereof will always be equal to the input signal 121. In the remote-align mode of control when no signal 121 is being provided, the update signal 124 will remain at the last value of the flow rate signal 106 provided as signal 121 and will not change unless the condition of either signal 102 or signal 103 changes or unless a new value is provided by the operator as signal 123.

The switch means 116 selects between the update signal 124 in the align mode and flow rate signal 106 in the automatic mode for delivery as a signal 126 to the switch means 112. The switch means 112 selects between the signal 126 in the remote mode and signal 106 in the local mode for delivery as a set point signal 127 to a flow control means 131.

A preferred flow controller means 131 is of the type capable of implementing an algorithm of the general form $$SF = SF + (TS/TR) * (FS - FL)$$

where
$SF$ = the flow controller output signal = signal 132
$TS$ = elapsed time
$TR$ = controller reset time
$FS$ = controller set point signal = signal 127, and
$FL$ = the lagged flow rate signal = signal 106.

The flow control means compares its set point signal 127 to the lagged flow rate signal 106 and produces alignment set point signal 132 responsive to the difference between signals 106 and 127. The switch means 113 selects between the alignment set point signal 132 in the remote control mode and the lagged flow rate signal 106 in the local control mode for delivery as a signal 134 to the switch means 117. The switch means 117 selects between signal 134 in the align mode and the supervisory set point signal 136 in the automatic mode for delivery as a digital remote set point signal 138.

Since, in the preferred embodiment illustrated, switch means 115, 116, and 117 are permitted only in the align position whenever switch means 75 is in its local position, the remote digital set point signal 138 is available to the automatic controller means 64 as a signal equal to the lagged flow rate signal 106 whenever the local control mode is being used, and equal to the alignment set point signal 132 whenever the remote-align mode of control is being used. The signal 138 can therefore be used by the automatic control means 64 to maintain the supervisory set point signal 136 equal to signal 138 in preparation for transfer to the automatic control mode. In addition, the digital flow rate signal 101 is provided to the automatic controller means 64 for use in computing the supervisory set point signal 136 in the automatic control mode. As previously indicated, the use of other process measurement signals in addition to, or in lieu of, the controlled process parameter for determining a supervisory control signal 136 is within the scope of the invention. In addition, although use of the flow rate signal 101 by the automatic control means 64 has been illustrated, the lagged flow rate signal 106 could be used if the automatic control means is not provided with separate input signal filtering means.

The digital remote set point signal 138 is converted by a digital to analog converter means 87 to an electrical analog signal 88, which is in turn converted to a pneumatic signal by a current to pneumatic converter means 89 in order to produce the pneumatic remote set point signal 77.

When the control system illustrated by FIG. 3 is being operated in the local control mode, the preferred automatic controller means 64 continuously produces a supervisory set point signal 136 which is equal to the lagged flow rate signal 106. Because the pneumatic to current converter means 80, the analog to digital converter means 82, the digital to analog converter means 87, and the current to pneumatic converter means 89 are not a part of a closed control system loop when the local mode of control is being employed, any error in calibration or sensitivity of these devices has not been compensated for by the control system. When a change from local to automatic control is desired, the switch means 75 is changed from the local position to the remote position, thereby changing switch means 111, 112, and 113 to the remote position while switch means 115, 116, and 117 remain in their align position. This action causes the last value of the lagged flow rate signal 106 prior to the change from local to remote control to be stored as a constant value within the set point update means 122 and to be delivered as the set point signal 127 to the flow control means 131. At the instant of transfer, signals 106 and 127 will therefore be equal and the bumpless transfer of control to the flow control means 131 will be accomplished. At this point, the conversion means 80, 82, 87, and 89 have become a part of the closed new control system and any difference between the remote set point signal 77 and the previous local set point signal 76 caused by errors in these conversion means or in other process control equipment will be compensated for by the flow control means 131 which will readjust the remote set point signals 138 and 77 in order to reestablish the lagged flow rate signal 106 at the same value it had prior to transfer from local to remote control. When the lagged flow rate signal 106 has returned to its previously stated value, or to a value which does not differ significantly from its previously stated value, switches 115, 116, and 117 can be changed by means of the mode select signal 103 to the automatic position. Since the supervisory set point signal 136 is maintained equal to the remote set point signal 138 during the alignment mode of operation, transfer from alignment mode to the automatic mode will be accomplished without a change in the remote set point signal 77 and without the need for the automatic controller means 64 to exercise its control function to compensate for instrument error within the control loop.

As soon as the system is switched to automatic control from the alignment control mode, the lagged flow rate signal 106 is again provided by switch means 115 as a signal 121 to the set point update means 122 so that bumpless transfer from the automatic mode to the remote-align mode can be accomplished when desired simply by changing the condition of the signal 103. When the system is in the remote-align mode and alignment has been accomplished, operator entry of a new set point signal 123 can be used as an alternative to transfer back to the local control mode to make a desired change in the set point to the flow control means 62.

Suitable apparatus which can be utilized in conjunction with the preferred embodiment of the invention illustrated by FIG. 3 is as follows:

Flow controller 62 — Foxboro Constatrol Model 130 Pneumatic, Foxboro, Massachusetts Flow transducer 67 — Foxboro Type 13A, Foxboro, Massachusetts Pressure to current converter 80 — Moore Products Model 7801, Spring-House, Pennsylvania Analog to digital converter 82 — Applied Automation Model 313 AIMS, Applied Automation Model 311 AI, Multiplexer Bartlesville, Oklahoma Digital to analog converter 87 — Applied Automation Model 314, Bartlesville, Oklahoma Current to pressure converter 89 — Fisher Control Type 546, Marshaltown, Iowa Digital input means 86 — Applied Automation Model 310, Bartlesville, Oklahoma Alignment controller and automatic controller — Interdata Model 70, digital computer Ocean Port, N.J.

Control valve 163 — Fisher Control Type 655-G1, Marshaltown, Iowa

Figure 4:
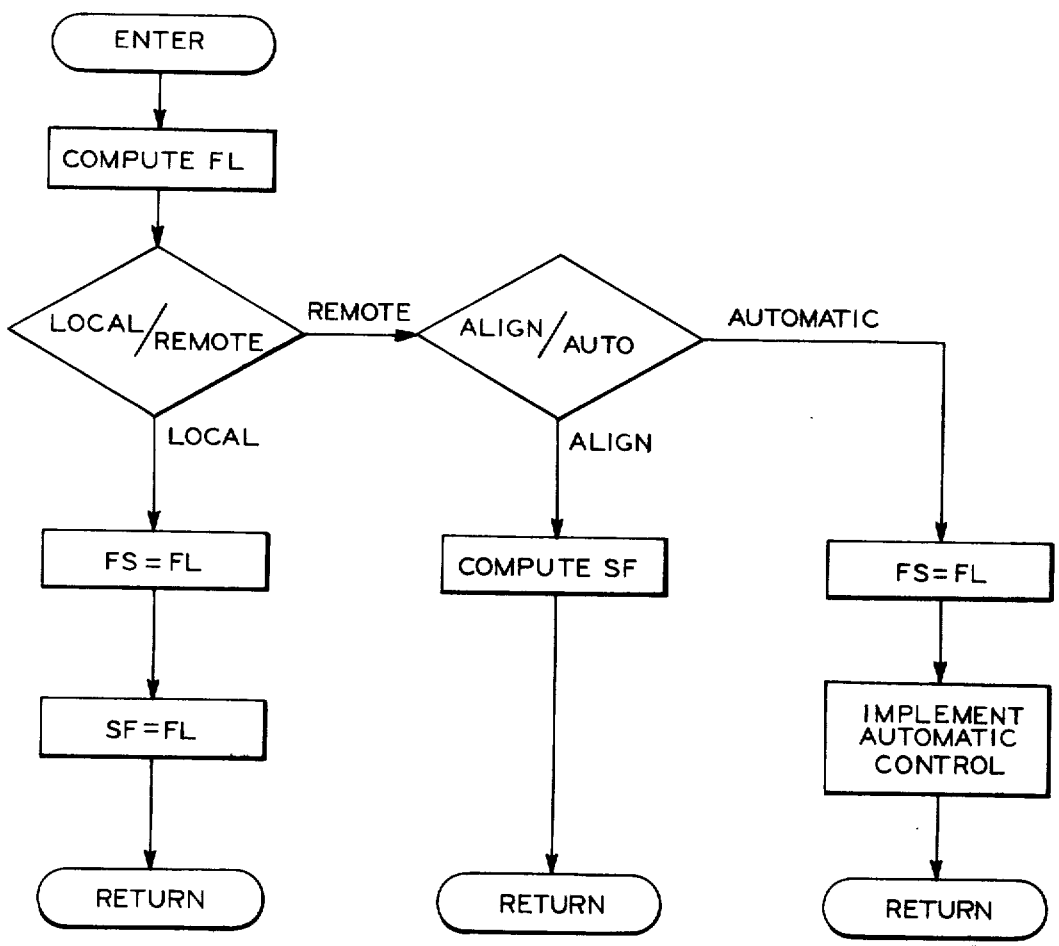
FIG. 4 is a flow chart illustrating the manner in which a digital computer could be programmed to implement the control system illustrated by FIG. 3.

FIG. 4 is a flow chart of a preferred digital implementation of the alignment controller means 66 illustrated by FIG. 3. Using the flow chart as a guide, those skilled in the art will be capable of implementating a control system in accordance with the invention. Although the flow chart is presented in terms of a subroutine which can be incorporated as a portion of an overall control system, other techniques for incorporating an equivalent control system are within the scope of the invention. Abbreviations used in the flow chart can be related to the various signals illustrated by FIG. 3 as follows:

FL = lagged flow rate = signal 106;
FS = flow controller set point = signal 127; and
SF = remote set point = signal 138.

Although the implementation of the control system can be accomplished in any desired manner, the following program steps for use as a bumpless transfer subroutine in a programmable digital computer utilizing a suitable computer language such as Fortran or PCL (Process Control Language) represent one example of a specific implementation:

```
 1 C
 2 C    BUMPLESS TRANSFER SUBROUTINE
 3 C
 4      SUBROUTINE BT(TR,F,FL,FS,SF,LR,MA)
 5      TS = 0.1
 6      TL = 0.5
 7 C
 8      FL = FL + (TS/TL) * (F-FL)
 9 C
10      IF (LR) 1,1,2
11 C
12    1 FS = FL
13      SF = FL
14      RETURN
15 C
16    2 IF (MA) 3,3,4
17    3 SF = SF + (TS/TR) * (FS-FL)
18      RETURN
19 C
20    4 FS = FL
21      AA = 1
22      RETURN
23 C
24      END
```

Abbreviations utilized in the designated programmed steps are as follows:

TR = desired reset time constant of flow controller 131;
F = flow rate = signal 102;
FL = lagged flow rate = signal 106;
FS = flow controller 131 set point = signal 127;
SF = remote flow set point = signal 138;
LR = local/remote switching means position;
MA = align/automatic switching means position;
TS = interval at which bumpless transfer subroutine is called by main program;
TL = lag time constant of lag means 105; and
AA = switching code to implement automatic control.

Figure 5:
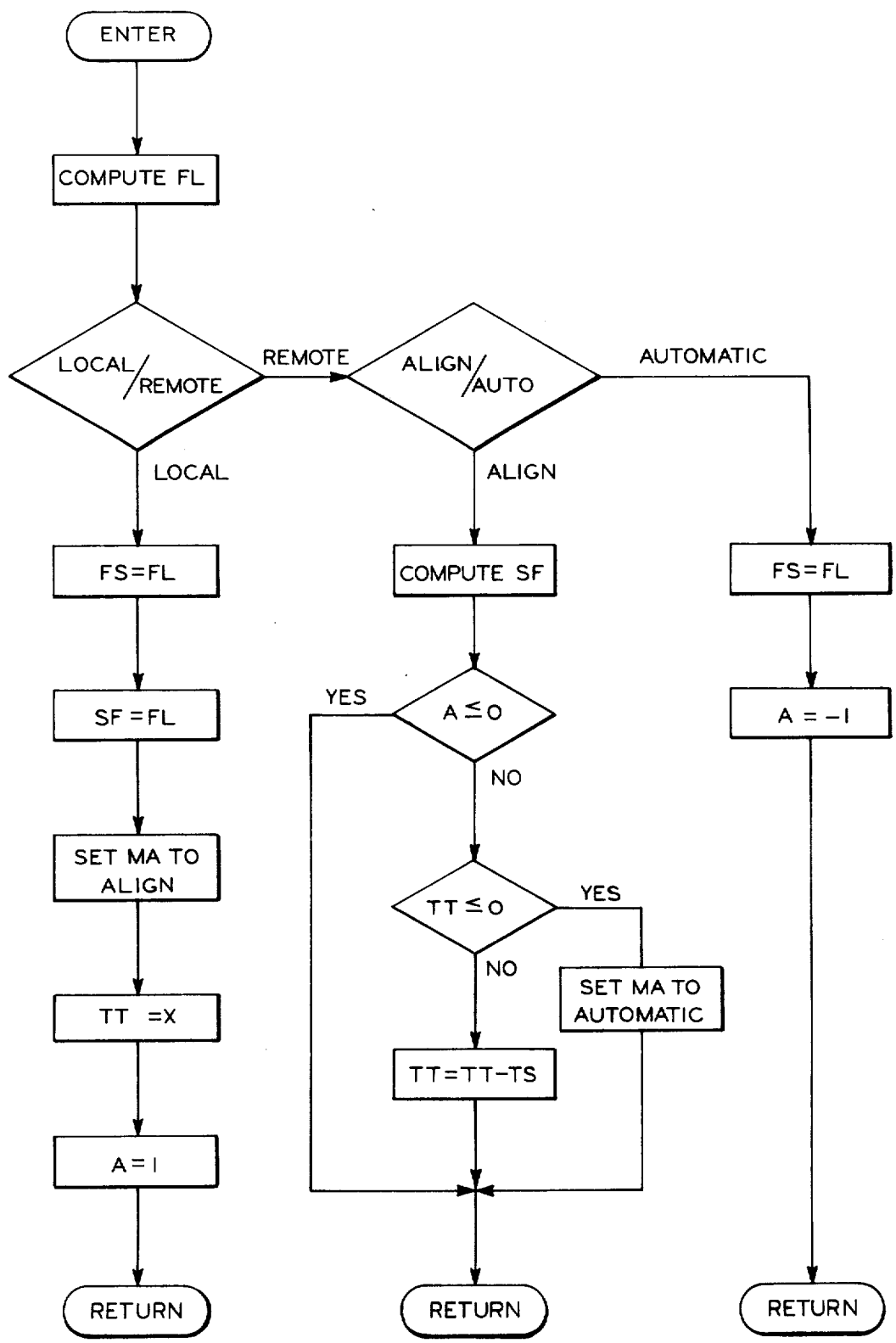
FIG. 5 is a flow chart illustrating adaptation of the preferred control system of FIGS. 3 and 4 to provide totally automated transition from conventional to automatic control in accordance with the invention.

As previously indicated, it is within the scope of the invention to provide fully automatic transfer from local to remote automatic control. FIG. 5 is a flow chart presented in the same terms as the flow chart of FIG. 4 and illustrates one possible technique by which such a fully automatic system could be implemented. The abbreviations used by FIG. 5 are the same as those used by FIG. 4 with the following additions:

X = a preselected transfer time or condition to be met during which remote-align control is to be interposed between local and remote-automatic control;
A = a value used to determine whether the control system has been switched to remote-align control from local control or from remote-automatic control;
TT = a value used to keep track of the time elapsed since initiation of remote-align control following local control; and
TS = the interval at which the subroutine is called by the main program or the elapsed time since the subroutine was previously called.

In a system implemented in accordance with the flow chart of FIG. 5, operation in response to the local mode of control will continuously maintain the align-/automatic switching means in the align mode, will maintain a value of TT equal to the required alignment time, and will maintain a value of A equal to 1. When the local-remote switch is switched by the operator to its remote position, the system will automatically be placed into the remote-align control mode. A value of A greater than 0 and a value of TT greater than 0 will cause the system to remain in the align mode until the time elapsed is sufficient to reduce the value of TT to 0. At that time the align/automatic switch will be automatically changed to the automatic mode. Operation in the automatic mode will maintain a value of A equal to −1 so that the operator can, if he desires, change from automatic to alignment control without imposing a time limitation on the length of time the system will remain in the alignment control mode. The operator can likewise change from automatic to local control but cannot thereafter change from local to automatic control without having the control system impose an interim period of control in the alignment mode.

Various other similar fully automatic control systems could be implemented by those skilled in the art. For example, requirement of a period of alignment control sufficient to reduce a selected control error to a preselected minimum value could be substituted for a fixed total time period of control. Likewise, rather than automatically changing from alignment control to automatic control at the end of the required alignment mode of operation, the system could initiate a visual signal to the operator and permit the operator to transfer from alignment to automatic control at a time following completion of the alignment control function.

Although the invention has been disclosed in conjunction with preferred embodiments thereof, those skilled in the art are capable of adapting the disclosed invention for use with various control systems. For example, use of an electrical analog alignment control means and electrical analog automatic control means using an analog memory device as the remote-align set point update means 122 in the system illustrated by FIG. 3 and omitting the analog to digital converter 82 and digital to analog converter 87 would result in an electrical analog system operable in accordance with the invention. Those skilled in the art will also be able to utilize, in accordance with the invention, systems having a supervisory or automatic controller which provides set point signals to a plurality of process controllers by providing an alignment controller for use in conjunction with each of the controlled variables and by providing sequencing or other interdependent control means known in the art to align all the controlled process variables prior to transferring control of the variables to the automatic control means. In addition, numerous other variations and modifications within the capability of those skilled in the art are considered to be within the scope of the invention and the appended claims thereto.

We claim:

1. A method for transferring control of a process parameter from control in response to a local set point signal to control in response to an automatic set point signal not directly compatible with said local set point signal, said method comprising:

establishing a process parameter signal compatible with said automatic set point signal and responsive to the condition of said process parameter;

substituting control in response to an aligning set point signal compatible with said automatic set point signal for control in response to said local set point signal for control of said process parameter, said aligning set point signal being generated in response to a comparison of the value of a fixed signal representative of the value of said process parameter signal immediately prior to substitution of said aligning set point signal with the value of said process parameter signal following said substitution of said aligning set point signal;

maintaining said automatic control set point signal equal to said aligning set point signal when said process parameter is being controlled in response to said aligning set point signal;

maintaining control in response to said aligning set point signal for a period of time sufficient to permit said aligning set point signal to at least substantially reach a stable steady-state condition; and substituting said automatic control set point signal for said aligning set point signal for control of said process parameter to implement automatic control of said process parameter.

2. A method in accordance with claim 1 wherein said local set point control of said process parameter is accomplished by comparing a local set point signal to a process measurement signal and wherein said process parameter signal is established in response to said process measurement signal.

3. A method in accordance with claim 2 wherein said automatic control set point signal is generated in response to said process parameter signal.

4. A method in accordance with claim 2 wherein said automatic control set point signal is generated in response to process signals other than said process parameter signal.

5. A method in accordance with claim 2 wherein said process parameter signal is established in response to said process measurement signal by converting a pneumatic process measurement signal to a digital electronic process parameter signal.

6. Apparatus comprising local control means for controlling a parameter of a process in response to a comparison of a first set point signal and a process measurement signal generated in response to measurement of a condition within said process, said first set point signal and said process measurement signal being of a first signal format;

means for providing a preselected signal of said first signal format to said local control means for use as said first set point signal;

means for generating a process parameter signal, of a second signal format which is not directly compatible with said first signal format, in response to said process measurement signal;

alignment control means for generating an alignment set point signal of said second signal format in response to a comparison of said process parameter signal with a second set point signal;

means for translating said alignment set point signal to said first signal format and for substituting the translated alignment set point signal for said preselected signal for use as said first set point signal;

automatic control means for generating an automatic set point signal of said second signal format in response to one or more process variable measurements;

means for substituting said automatic set point signal for said alignment set point signal for translation and use as said first set point signal; and means for maintaining said automatic set point signal equal to said alignment set point signal when said alignment set point signal is being translated for use as said first set point signal.

7. Apparatus in accordance with claim 6 additionally comprising means for establishing said second set point signal equal to the value of said process parameter signal at the time said alignment set point signal is substituted for use as said first set point signal.

8. Apparatus in accordance with claim 6 additionally comprising means for preventing substitution of said automatic set point signal for said preselected signal for use as said first set point signal.

9. Apparatus in accordance with claim 7 additionally comprising means for substituting said preselected signal for the translated alignment set point signal or the translated automatic set point signal for use as said first set point signal and means for substituting said alignment set point signal for said automatic set point signal for translation and use as said first set point signal.

10. Apparatus in accordance with claim 9 additionally comprising means for establishing said second set point signal equal to the value of said process parameter signal at the time said alignment set point signal is substituted for use as said first set point signal.

11. A method in accordance with claim 1 additionally comprising maintaining said automatic control set point signal equal to said process parameter signal when said local set point signal is being used to control said process parameter.

12. Apparatus in accordance with claim 6 additionally comprising means for maintaining said automatic set point signal equal to said process parameter signal when said preselected signal is being used as said first set point signal.

* * * * *